United States Patent
Ho et al.

(10) Patent No.: US 11,530,297 B2
(45) Date of Patent: Dec. 20, 2022

(54) TRANSPARENT POLYIMIDE FILM

(71) Applicant: TAIMIDE TECH. INC., Hsinchu (TW)

(72) Inventors: Yi-Hsueh Ho, Hsinchu (TW); Yi-Ting Liu, Hsinchu (TW)

(73) Assignee: TAIMIDE TECH. INC., Hsinchu (TW)

( * ) Notice: Subject to any disclaimer, the term of this patent is extended or adjusted under 35 U.S.C. 154(b) by 285 days.

(21) Appl. No.: 16/656,807

(22) Filed: Oct. 18, 2019

(65) Prior Publication Data

US 2020/0131313 A1    Apr. 30, 2020

(30) Foreign Application Priority Data

Oct. 30, 2018  (TW) ................. 107138340

(51) Int. Cl.
  *C08G 73/10*  (2006.01)
  *C08J 5/18*  (2006.01)
  *C08G 73/12*  (2006.01)

(52) U.S. Cl.
  CPC ..... *C08G 73/1078* (2013.01); *C08G 73/1007* (2013.01); *C08G 73/1032* (2013.01); *C08G 73/1039* (2013.01); *C08G 73/1042* (2013.01); *C08G 73/1067* (2013.01); *C08G 73/1071* (2013.01); *C08G 73/123* (2013.01); *C08G 73/126* (2013.01); *C08G 73/127* (2013.01); *C08J 5/18* (2013.01); *C08J 2379/08* (2013.01)

(58) Field of Classification Search
  CPC .................. C08G 73/1078; C08G 73/1007
  See application file for complete search history.

(56) References Cited

U.S. PATENT DOCUMENTS

| | | | |
|---|---|---|---|
| 2010/0048861 A1* | 2/2010 | Jung ................ | C08G 73/1039 528/347 |
| 2018/0037698 A1* | 2/2018 | Miyamoto ......... | C08G 73/1071 |
| 2020/0172675 A1* | 6/2020 | Radu ................. | C08G 73/1042 |

OTHER PUBLICATIONS

Giti et al, "Effect of Varying Thickness and Number of Coloring Liquid Applications on the Color of Anatomic Contour Monolithic Zirconia Ceramics", Dec. 2018, Journal of Dentistry, Shiraz University of Medical Sciences, 19(4), 311-319 (Year: 2018).*

* cited by examiner

*Primary Examiner* — Jasper Saberi
(74) *Attorney, Agent, or Firm* — Li & Cai Intellectual Property (USA) Office

(57) ABSTRACT

A transparent polyimide film, prepared from a copolymerized polyamide acid according to a chemical cyclization method, is provided. The copolymerized polyamide acid requires at least a semi-aromatic polyamide acid, and the semi-aromatic polyamide acid is formed by reacting cyclobutane-1,2,3,4-tetracarboxylic dianhydride (CBDA) and 2,2'-bis(trifluoromethyl)diaminodiphenyl (TFMB). The molar number of dianhydrides of the semi-aromatic polyamide acid is more than 20% of the total molar number of anhydrides of the copolymerized polyamide acid, so that the transparent polyimide film has a light transmittance greater than 80%, a chroma b* less than 5, and a CTE less than 35 ppm/° C.

3 Claims, 2 Drawing Sheets

TRANSPARENT POLYIMIDE FILM

CROSS-REFERENCE TO RELATED PATENT APPLICATION

This application claims the benefit of priority to Taiwan Patent Application No. 107138340, filed on Oct. 30, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a transparent polyimide film, and in particular, to a transparent polyimide film having a lower Coefficient of Thermal Expansion (CTE) for better thermal stability.

BACKGROUND OF THE DISCLOSURE

Polyimide films have excellent heat resistance and mechanical properties, and are therefore often applied to the field of flexible circuit board applications with high temperature processes. In addition, since the transparent polyimide film has good bending resistance and optical properties, in recent years, the polyimide film is one of few materials that can meet the requirements of optical properties and heat resistance in the field of displays for electronic display.

Although the transparent polyimide film has good optical properties and temperature resistance, it is still insufficient in heat stability. In the field of flexible electronic materials, metal lines need to be attached to the polyimide film, and thus the dimensional stability of the line depends on the CTE of the polyimide film In general, the transparent polyimide film has a higher CTE, and thus the metal line attached to the polyimide film has poor dimensional stability under heat. Moreover, in order to reduce the CTE of the transparent polyimide film, a highly rigid aromatic cyclic dianhydride monomer is often used, and the copolymerized polyimide film formed can prepare a transparent polyimide film of a lower CTE. However, this will cause adverse effects such as low light transmittance (less than 80%) and yellow chroma b*.

SUMMARY OF THE DISCLOSURE

In response to the above-referenced technical inadequacies, the present disclosure provides a transparent polyimide film prepared from a copolymerized polyamide acid by a chemical cyclization method. The copolymerized polyamide acid requires at least a semi-aromatic polyamide acid, and the semi-aromatic polyamide acid is formed by reacting cyclobutane-1,2,3,4-tetracarboxylic dianhydride (CBDA) and 2,2'-bis(trifluoromethyl)diaminodiphenyl (TFMB). The molar number of dianhydrides of the semi-aromatic polyamide acid is more than 20% of the total molar number of anhydrides of the copolymerized polyamide acid, so that the transparent polyimide film has a light transmittance of greater than 80%, a chroma b* of less than 5, and a CTE of less than 35 ppm/° C.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
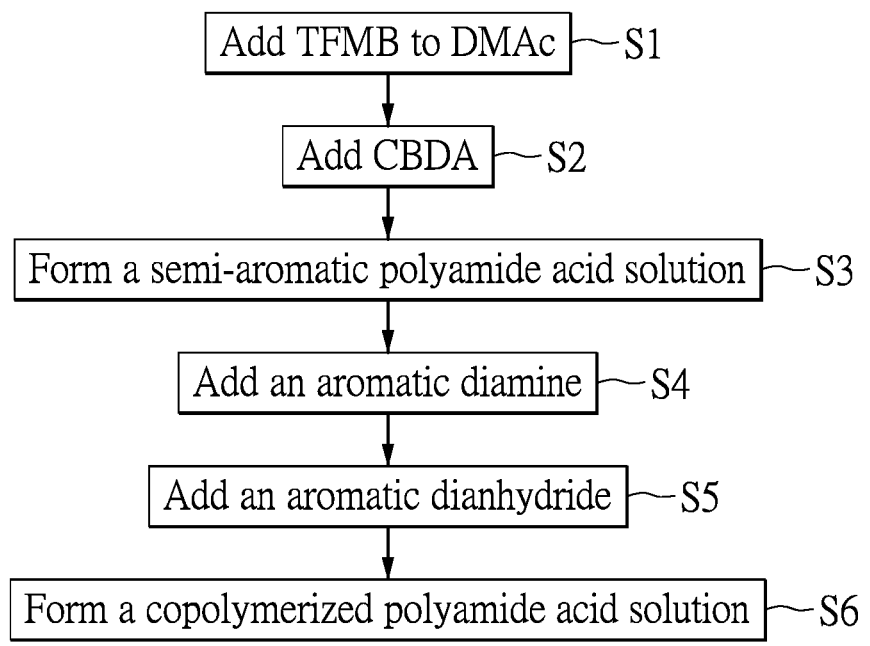
FIG. 1 is a flowchart showing the preparation of a copolymerized polyamide acid of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

A transparent polyimide film prepared from a copolymerized polyamide acid by a chemical cyclization method. The copolymerized polyamide acid requires at least a semi-aromatic polyamide acid, and the semi-aromatic polyamide acid is formed by reacting CBDA and TFMB. The molar number of dianhydrides of the semi-aromatic polyamide acid is more than 20% of the total molar number of anhydrides of the copolymerized polyamide acid, so that the transparent polyimide film has a light transmittance greater than 80%, a chroma b* less than 5, and a CTE less than 35 ppm/° C.

The copolymerized polyamide acid further includes an aromatic polyamide acid, and the aromatic polyamide acid is obtained by reacting an aromatic diamine and an aromatic anhydride. The aromatic diamine includes 2,2'-bis(trifluoromethyl)benzidine (TFMB), 2,2'-bis [4-(4-aminophenoxyphenyl)]propane (BAPP), 2,2-bis[4-(4-aminophenoxy)phenyl]-1,1,1,3,3,3-hexafluoropropane (HFBAPP), 5(6)-amino-1-(4-aminophenyl)-1,3,3-trimethylindan (TMDA), p-phenylenediamine (PDA), 4,4'-bis(4-aminophenoxyl)biphenyl (BAPB), 2,2'-bis(trifluoromethyl)-4,4'-diaminophenyl ether (6FODA), 4,4'-bis(4-aminophenoxyl)diphenyl sulfone (BAPS), 9,9-bis(4-aminophenyl)fluorene (BAFL), 4,4'-diaminodiphenyl sulfone (44DDS), 4,4'-diaminodiphenyl ether (ODA), 4,4'-diaminobenzophenidine (44DABA), 2,2-bis(4-aminophenyl)hexafluoropropane (Bis-A-AF), m-phenylenediamine (mPDA), 2,2-bis(3-amino-4-hydroxyphenyl)hexafluoropropane (6FAP), 3,5-diaminobenzoic acid (35DABA), 2-(4-aminophenyl)-5-aminobenzoxazole (5BPOA), 1,4-bis(4-aminophenoxyl)benzene (TPEQ), and 4,4'-[1,4-phenylbis(oxygen)]bis[3-(trifluoromethyl)aniline] (FAPB). The aromatic dianhydride includes 1,2,4,5-benzenetetracarboxylic anhydride (PMDA), 3,3',4,4'-biphenyltetracarboxylic dianhydride (BPDA), 4,4'-oxydiphthalic anhydride (ODPA), 3,3',4,4'-benzophenonetetracarboxylic dianhydride (BTDA), 3,3,4,4-diphenylsulfone tetracarboxylic anhydride (DSDA), 2,3,3',4'-biphenyltetracarboxylic dianhydride (α-BPDA), 4,4-hexafluoro isopropyl phthalic anhydride (6FDA), and 4,4'-(4,4'-isopropyldiphenoxy)diphthalic anhydride (BPADA).

[Preparation of a Copolymerized Polyamide Acid]

Referring to FIG. 1, TFMB is first added to N,N-dimethylacetamide (DMAc) (S1), CBDA is added after complete dissolution (S2), and the reaction is performed for 6 h with stirring, and the temperature is continuously maintained at 25° C. to form a semi-aromatic polyamide acid solution (S3). Another aromatic diamine is further added to the semi-aromatic polyamide acid solution (S4), then another aromatic dianhydride is added after stirring until completely dissolved (S5), dissolution and reaction are performed after stirring for a certain period of time, and the temperature of the solution is maintained at 25° C., and finally, a copolymerized polyamide acid solution with the solid content of 25% is obtained (S6).

[Preparation of a Transparent Polyimide Film]

Figure 2:
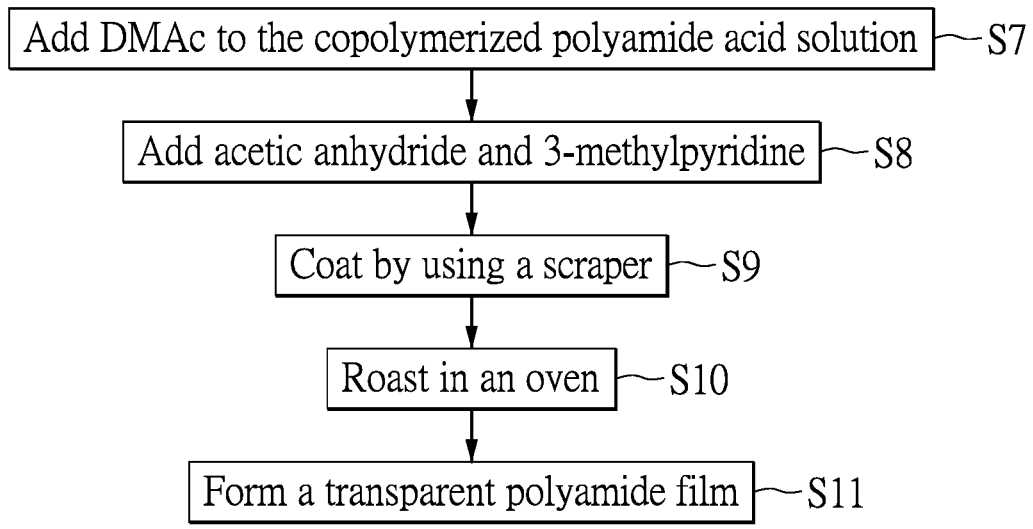
FIG. 2 is a flowchart showing the preparation of a transparent polyimide film of the present disclosure.

Referring to FIG. 2, the copolymerized polyamide acid solution is diluted with DMAc (S7), then acetic anhydride and 3-methylpyridine are added, respectively (S8). In this case, it should be noted that the formulation with the CBDA component will be diluted due to the decrease in solubility after the addition of acetic anhydride and 3-methylpyridine, and the precipitate gradually returns to fluidity after standing for about 3-5 min, and a glass plate is coated with the solution by using a scraper after the fluidity is restored (S9). The coated sample is roasted in an oven at 50° C. for 20 min, and slowly heated to 170° C. for 20 min, and then heated to 260° C. for 20 min for final treatment, so as to obtain a transparent polyimide film having a thickness of 10-80 μm.

[Detection Method]

The thermal and optical properties of the transparent polyimide film obtained in the following examples are measured using the following methods.

(1) Chroma b* is measured using Nippon Denshoku's model NE-4000 instrument according to the ASTM E313 standard.

(2) Light transmittance is measured using Nippon Denshoku's model NDH-2000N instrument according to the ISO 14782 standard.

(3) CTE is measured using TA Instruments' model Q400 TMA instrument according to the ASTM D696 standard.

The CTE of the transparent polyimide film at 100-200° C. is measured, and the heating rate is set to 10° C./min. In order to remove the stress caused by the heat treatment, the second measurement result is taken as the actual value after the residual stress is removed by the first measurement.

EXAMPLE 1

[Preparation of a Copolymerized Polyamide Acid Solution]

20.1 g of TFMB (0.0627 mole, 0.315 of the total diamine molar ratio) is added to 412.5 g of DMAc, 11.723 g of CBDA (0.0598 mole, 30% of the total anhydride molar percentage) is added after complete dissolution, and the reaction is performed for 6 h while stirring, and the temperature is continuously maintained at 25° C. to obtain a semi-aromatic polyamide acid solution. 43.711 g of TFMB (0.1365 mole) is added to the semi-aromatic polyamide acid solution and is stirred until being completely dissolved, and 61.965 g of 6FDA (0.1395 mole) is added, and dissolution and reaction are performed after stirring for a certain period of time, and the temperature of the solution is maintained at 25° C., to finally obtain the copolymerized polyamide acid solution having a solid content of 25%.

[Preparation of a Transparent Polyimide Film]

54.4 g of the copolymerized polyamide acid solution is taken out, and the solid content is diluted to 17% with DMAc, and then 11.2 ml of acetic anhydride and 3.8 ml of 3-methylpyridine are respectively added, gelation is caused by a decrease in solubility after uniform stirring, and the fluidity is restored after standing for 5 min, and a glass plate is coated with the solution by using a scraper having a gap of 900 μm. The coated sample is roasted in an oven at 50° C. for 20 min, then slowly heated to 170° C. for 20 min, and heated to 260° C. for 20 min for final treatment.

The transparent polyimide film prepared has a CTE of 22 ppm/° C. between 100° C. and 200° C., a chroma b* of 1.1, and a light transmittance of 89%.

EXAMPLE 2

[Preparation of a Copolymerized Polyamide Acid Solution]

27.800 g of TFMB (0.0868 mole, 0.42 of the total diamine molar ratio) is added to 412.5 g of DMAc, 16.214 g of CBDA (0.0827 mole, 40% of the total anhydride molar percentage) is added after complete dissolution, and the reaction is performed for 6 h with stirring, and the temperature is continuously maintained at 25° C. to obtain a semi-aromatic polyamide acid solution. 38.391 g of TFMB (0.120 mole) is added to the semi-aromatic polyamide acid solution and is stirred until completely dissolved, and 55.094 g of 6FDA (0.124 mole) is added, and dissolution and reaction are performed after stirring for a certain period of time, and the temperature of the solution is maintained at 25° C., to finally obtain the copolymerized polyamide acid solution having a solid content of 25%.

[Preparation of a Transparent Polyimide Film]

54.4 g of the copolymerized polyamide acid solution is taken out, and the solid content is diluted to 17% with DMAc, and then 10.9 ml of acetic anhydride and 3.7 ml of 3-methylpyridine are respectively added, gelation is caused by a decrease in solubility after uniform stirring, and the fluidity is restored after standing for 5 min, and a glass plate is coated with the solution by using a scraper having a gap of 900 μm. The coated sample is roasted in an oven at 50° C. for 20 min, then slowly heated to 170° C. for 20 min, and heated to 260° C. for 20 min for final treatment.

The transparent polyimide film prepared has a CTE of 23 ppm/° C. between 100° C. and 200° C., a chroma b* of 2.6, and a light transmittance of 89%.

EXAMPLE 3

[Preparation of a Copolymerized Polyamide Acid Solution]

42.972 g of TFMB (0.1342 mole, 0.625 of the total diamine molar ratio) is added to 412.5 g of DMAc, 21.053 g of CBDA (0.1074 mole, 50% of the total anhydride molar percentage) is added after complete dissolution, and the reaction is performed for 6 h with stirring, and the temperature is continuously maintained at 25° C. to obtain a semi-aromatic polyamide acid solution. 25.783 g of TFMB (0.0805 mole) is added to the semi-aromatic polyamide acid solution and is stirred until completely dissolved, and 47.691 g of 6FDA (0.1074 mole) is added, and dissolution and reaction are performed after stirring for a certain period of time, and the temperature of the solution is maintained at 25° C., to finally obtain the copolymerized polyamide acid solution having a solid content of 25%.

[Preparation of a Transparent Polyimide Film]

54.4 g of the copolymerized polyamide acid solution is taken out, and the solid content is diluted to 17% with DMAc, and then 12.0 ml of acetic anhydride and 4.1 ml of 3-methylpyridine are respectively added, gelation is caused by a decrease in solubility after uniform stirring, and the fluidity is restored after standing for 5 min, and a glass plate is coated with the solution by using a scraper having a gap of 900 μm. The coated sample is roasted in an oven at 50° C. for 20 min, then slowly heated to 170° C. for 20 min, and heated to 260° C. for 20 min for final treatment.

The transparent polyimide film prepared has a CTE of 19 ppm/° C. between 100° C. and 200° C., a chroma b* of 2.7, and a light transmittance of 89%.

COMPARATIVE EXAMPLE 1

[Preparation of a Polyamide Acid Solution]

57.598 g of TFMB (0.1799 mole) is added to 412.5 g of DMAc, and 79.902 g of 6FDA (0.1799 mole) is added after complete dissolution, and the temperature is controlled to 25° C. when added, the reaction is performed for 24 h with stirring, and the temperature is maintained at 25° C. to finally obtain the polyamide acid solution having a solid content of 25%.

[Preparation of a Transparent Polyimide Film]

54.4 g of the polyamide acid solution is taken out, and the solid content is diluted to 17% with DMAc, and then 10.1 ml of acetic anhydride and 3.5 ml of 3-methylpyridine are respectively added, and a glass plate is coated with the solution after uniform stirring by using a scraper having a gap of 900 μm. The coated sample is roasted in an oven at 50° C. for 20 min, then slowly heated to 170° C. for 20 min, and heated to 260° C. for 20 min for final treatment.

The transparent polyimide film prepared has a CTE of 51 ppm/° C. between 100° C. and 200° C., a chroma b* of 0.5, and a light transmittance of 89%.

COMPARATIVE EXAMPLE 2

[Preparation of a Copolymerized Polyamide Acid Solution]

9.56 g of TFMB (0.0299 mole, 0.158 of the total diamine molar ratio) is added to 412.5 g of DMAc, 5.562 g of CBDA (0.0284 mole, 15% of the total anhydride molar percentage) is added after complete dissolution, and the reaction is performed for 6 h with stirring, and the temperature is continuously maintained at 25° C. to obtain a semi-aromatic polyamide acid solution. 50.979 g of TFMB (0.1592 mole) is added to the semi-aromatic polyamide acid solution and is stirred until completely dissolved, and 71.393 g of 6FDA (0.1607 mole) is added, and dissolution and reaction are performed after stirring for a certain period of time, and the temperature of the solution is maintained at 25° C., to finally obtain the copolymerized polyamide acid solution having a solid content of 25%.

[Preparation of a Transparent Polyimide Film]

40.40 g of the copolymerized polyamide acid solution is taken out, and the solid content is diluted to 20.2% with DMAc, and then 7.9 ml of acetic anhydride and 4.1 ml of 3-methylpyridine are respectively added, gelation is caused by a decrease in solubility after uniform stirring, and the fluidity is restored after standing for 5 min, and a glass plate is coated with the solution by using a scraper having a gap of 900 μm. The coated sample is roasted in an oven at 50° C. for 20 min, then slowly heated to 170° C. for 20 min, and heated to 260° C. for 20 min for final treatment.

The transparent polyimide film prepared has a CTE of 40 ppm/° C. between 100° C. and 200° C., a chroma b* of 1.0, and a light transmittance of 89%.

COMPARATIVE EXAMPLE 3

[Preparation of a Polyamide Acid Solution]

59.236 g of 6FODA (0.1799 mole) is added to 412.5 g of DMAc, and 78.264 g of 6FDA (0.1799 mole) is added after complete dissolution, and the temperature is controlled to 25° C. when added, the reaction is performed for 24 h with stirring, and the temperature is maintained at 25° C. to finally obtain the polyamide acid solution having a solid content of 25%.

[Preparation of a Transparent Polyimide Film]

54.4 g of the polyamide acid solution is taken out, and the solid content is diluted to 17% with DMAc, and then 9.9 ml of acetic anhydride and 3.4 ml of 3-methylpyridine are respectively added, and a glass plate is coated with the solution after uniform stirring by using a scraper having a gap of 900 μm. The coated sample is roasted in an oven at 50° C. for 20 min, then slowly heated to 170° C. for 20 min, and heated to 260° C. for 20 min for final treatment.

The transparent polyimide film prepared has a CTE of 52 ppm/° C. between 100° C. and 200° C., a chroma b* of 1.7, and a light transmittance of 89%.

The test comparison table of the examples and the comparative examples is as follows:

| | Semi-aromatic polyimide | | Aromatic polyimide | | Chroma b* | CTE ppm/° C. | Light transmittance % | Thickness μm |
|---|---|---|---|---|---|---|---|---|
| Example 1 | CBDA 30 | TFMB 100 | 6FDA 70 | (mol %) | 1.1 | 22 | 89 | 50 |
| Example 2 | CBDA 40 | TFMB 100 | 6FDA 60 | (mol %) | 2.6 | 23 | 89 | 50 |
| Example 3 | CBDA 50 | TFMB 100 | 6FDA 50 | (mol %) | 2.7 | 19 | 89 | 50 |
| Comparative Example 1 | | TFMB | 6FDA | | 0.5 | 51 | 89 | 50 |
| Comparative Example 2 | CBDA 15 | TFMB 100 | 6FDA 85 | (mol %) | 1.0 | 40 | 89 | 50 |
| Comparative Example 3 | | 6FODA | 6FDA | | 1.7 | 52 | 89 | 50 |

The contents of the foregoing specific examples are intended to describe the present disclosure in detail. However, these examples are merely used for illustration, and are not intended to limit the present disclosure. It will be understood by those skilled in the art that various changes or modifications made to the present disclosure without departing from the scope of the appended claims fall within the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A transparent polyimide film prepared from a copolymerized polyamide acid by a chemical cyclization method, wherein the copolymerized polyamide acid includes a semi-aromatic polyamide acid, and the semi-aromatic polyamide acid is formed by reacting cyclobutane-1,2,3,4-tetracarboxylic dianhydride (CBDA) and 2,2'-bis(trifluoromethyl)diaminodiphenyl (TFMB), wherein the molar number of dianhydrides of the semi-aromatic polyamide acid is more than 20% of the total molar number of anhydrides of the copolymerized polyamide acid, so that the transparent polyimide film has a thickness of 50-80 μm, a chroma b* less than 5, and a CTE less than 35 ppm/° C.;
wherein the copolymerized polyamide acid further includes 4,4-hexafluoro isopropyl phthalic anhydride (6FDA) with a molar number of more than 50% of the total molar number of anhydrides of the copolymerized polyamide acid.

2. The transparent polyimide film according to claim 1, wherein the copolymerized polyamide acid further includes an aromatic polyamide acid, and the aromatic polyamide acid is obtained by reacting an aromatic diamine and an aromatic dianhydride.

3. The transparent polyimide film according to claim 2, wherein the aromatic diamine is 2,2'-bis(trifluoromethyl) benzidine (TFMB), 2,2'-bis[4-(4-aminophenoxyphenyl)]propane (BAPP), 2,2-bis[4-(4-aminophenoxy)phenyl]-1,1,1,3,3,3-hexafluoropropane (HFBAPP), 5(6)-amino-1-(4-aminophenyl)-1,3,3-trimethylindan (TMDA), p-phenylenediamine (PDA), 4,4'-bis(4-aminophenoxyl)biphenyl (BAPB), 2,2'-bis(trifluoromethyl)-4,4'-diaminophenyl ether (6FODA), 4,4'-bis(4-aminophenoxyl)diphenyl sulfone (BAPS), 9,9-bis(4-aminophenyl)fluorene (BAFL), 4,4'-diaminodiphenyl sulfone (44DDS), 4,4'-diaminodiphenyl ether (ODA), 4,4'-diaminobenzophenidine (44DABA), 2,2-bis(4-aminophenyl)hexafluoropropane (Bis-A-AF), m-phenylenediamine (mPDA), 2,2-bis(3-amino-4-hydroxyphenyl)hexafluoropropane (6FAP), 3,5-diaminobenzoic acid (35DABA), 2-(4-aminophenyl)-5-aminobenzoxazole (5BPOA), 1,4-bis(4-aminophenoxyl)benzene (TPEQ), or 4,4'-[1,4-phenylbis(oxygen)]bis [3-(trifluoromethyl)aniline] (FAPB).

* * * * *